US011957124B2

(12) United States Patent
Kay et al.

(10) Patent No.: US 11,957,124 B2
(45) Date of Patent: Apr. 16, 2024

(54) ORGAN PERFUSION SYSTEMS

(71) Applicant: Organox Limited, Oxford (GB)

(72) Inventors: Stuart Brian William Kay, Cambridge (GB); David George Robinson, Cambridge (GB); Philip David Canner, Cambridge (GB); Peter Alan Salkus, Cambridge (GB); Leslie James Russell, Oxford (GB); Peter John Friend, Oxford (GB); Constantin C. Coussios, Oxford (GB)

(73) Assignee: ORGANOX LIMITED, Oxford (GB)

( * ) Notice: Subject to any disclaimer, the term of this patent is extended or adjusted under 35 U.S.C. 154(b) by 0 days.

(21) Appl. No.: 16/725,464

(22) Filed: Dec. 23, 2019

(65) Prior Publication Data
US 2020/0128813 A1 Apr. 30, 2020

Related U.S. Application Data

(63) Continuation of application No. 15/338,841, filed on Oct. 31, 2016, now abandoned, which is a (Continued)

(30) Foreign Application Priority Data

Nov. 10, 2011 (GB) .................................... 1119418
Nov. 10, 2011 (GB) .................................... 1119419
Nov. 8, 2012 (WO) ................. PCT/GB2012/052782

(51) Int. Cl.
*A01N 3/00* (2006.01)
*A01N 1/02* (2006.01)
*C12M 3/00* (2006.01)

(52) U.S. Cl.
CPC ........... *A01N 1/0247* (2013.01); *A01N 1/021* (2013.01); *Y10T 83/04* (2015.04)

(58) Field of Classification Search
CPC ...... A01N 1/021; A01N 1/0247; C12M 21/08
See application file for complete search history.

(56) References Cited

U.S. PATENT DOCUMENTS

| 3,772,153 | A | 11/1973 | De Roissart |
| 4,493,692 | A | 1/1985 | Reed |

(Continued)

FOREIGN PATENT DOCUMENTS

| DE | 197 02 098 A1 | 7/1998 |
| DE | 197 15 152 A1 | 10/1998 |

(Continued)

OTHER PUBLICATIONS

Examination Report Under Section 18(3) dated Feb. 3, 2017 for GB 1408217.6 filed Nov. 8, 2012.
(Continued)

*Primary Examiner* — Nathan A Bowers
(74) *Attorney, Agent, or Firm* — Wegman Hessler Valore (57) ABSTRACT

A disposable set of components for an organ perfusion system comprising a fluid supply duct for supplying fluid to the organ, a fluid removal duct for removing fluid from the organ, and a surrogate organ removably connected between the fluid supply duct and the fluid removal duct so as to form a fluid circuit, so that fluid can be circulated in the circuit in preparation for connection of the organ.

11 Claims, 10 Drawing Sheets

Related U.S. Application Data continuation of application No. 14/357,118, filed as application No. PCT/GB2012/052782 on Nov. 8, 2012, now abandoned.

(56) References Cited

U.S. PATENT DOCUMENTS

| | | | |
|---|---|---|---|
| 5,157,930 | A | 10/1992 | McGhee et al. |
| 5,462,416 | A | 10/1995 | Dennehey et al. |
| 5,695,717 | A | 12/1997 | Polaschegg et al. |
| 6,582,953 | B2 | 6/2003 | Brasile |
| 6,642,045 | B1 | 11/2003 | Brasile |
| 6,673,594 | B1 | 1/2004 | Owen et al. |
| 7,491,261 | B2 | 2/2009 | Warren et al. |
| 2001/0039440 | A1* | 11/2001 | Lasheras .................. A61F 7/12 607/113 |
| 2004/0170950 | A1 | 9/2004 | Prien |
| 2004/0220509 | A1 | 11/2004 | Olsen et al. |
| 2004/0235142 | A1 | 11/2004 | Schein et al. |
| 2004/0023844 | A1 | 12/2004 | Ragusa |
| 2005/0221269 | A1 | 10/2005 | Taylor et al. |
| 2005/0255442 | A1 | 11/2005 | Brassil et al. |
| 2006/0148062 | A1 | 7/2006 | Hassanein et al. |
| 2006/0224334 | A1 | 10/2006 | Zhang et al. |
| 2007/0227360 | A1 | 10/2007 | Atlas et al. |
| 2007/0275364 | A1 | 11/2007 | Hassanein et al. |
| 2008/0017194 | A1 | 1/2008 | Hassanein et al. |
| 2008/0032398 | A1 | 2/2008 | Cannon et al. |
| 2009/0197241 | A1 | 8/2009 | Fishman et al. |
| 2009/0197324 | A1 | 8/2009 | Fishman et al. |
| 2010/0028979 | A1 | 2/2010 | Faulkner et al. |
| 2010/0143192 | A1 | 6/2010 | Myrick et al. |
| 2010/0330547 | A1 | 12/2010 | Tempelman et al. |
| 2011/0003275 | A1* | 1/2011 | Steen .................. A01N 1/0247 435/1.2 |
| 2011/0065170 | A1* | 3/2011 | Fondevila Campo ... A01N 1/02 435/284.1 |
| 2011/0076666 | A1 | 3/2011 | Brassil |
| 2011/0136096 | A1 | 6/2011 | Hassanein et al. |
| 2012/0178150 | A1 | 7/2012 | Tempelman et al. |

FOREIGN PATENT DOCUMENTS

| | | |
|---|---|---|
| DE | 100 15 807 A1 | 10/2001 |
| EP | 0 109 373 A2 | 5/1984 |
| EP | 1017274 B1 | 12/2000 |
| EP | 1 168 913 B1 | 11/2005 |
| WO | 96/29865 A1 | 10/1996 |
| WO | 9915011 A1 | 4/1999 |
| WO | 02/077579 A1 | 10/2002 |
| WO | 2004/089085 A2 | 10/2004 |
| WO | 2006/042138 A2 | 4/2006 |
| WO | 2006/118990 A2 | 11/2006 |
| WO | 2007/124044 A2 | 11/2007 |
| WO | 2008/150587 A2 | 12/2008 |
| WO | 2009/020412 A1 | 2/2009 |
| WO | 2012/170633 A1 | 12/2012 |

OTHER PUBLICATIONS

International Search Report and Written Opinion dated Mar. 6, 2013 for PCT/GB2012/052783 filed Nov. 8, 2012.
International Preliminary Report on Patentability dated May 13, 2014 for PCT/GB2012/052783 filed Nov. 8, 2012.
Search Report Under Section 17 dated Mar. 8, 2012 for GB 1119420.6 filed Nov. 10, 2011.
International Search Report and Written Opinion dated Jun. 14, 2013 for PCT/GB2012/052782 filed Nov. 8, 2012.
International Preliminary Report on Patentability dated May 22, 2014 for PCT/GB2012/052782 filed Nov. 8, 2012.
Search Report Under Section 17 dated Mar. 7, 2012 for GB 1119418.0 filed Nov. 10, 2011.
Search Report Under Section 17 dated Mar. 7, 2012 for GB 1119419.8 filed Nov. 10, 2011.
International Search Report and Written Opinion dated Jul. 5, 2013 for PCT/GB2012/052781 filed Nov. 8, 2012.
International Preliminary Report on Patentability dated May 22, 2014 for PCT/GB2012/052781 filed Nov. 8, 2012.
Search Report Under Section 17 dated Mar. 8, 2012 for GB 1119417.2 filed Nov. 10, 2011.
Canadian Office Action of corresponding Canadian Patent Application No. 2,855,339 dated May 3, 2023, 5 pages.

* cited by examiner

ORGAN PERFUSION SYSTEMS

CROSS REFERENCE TO RELATED APPLICATIONS

This application claims the priority benefit of U.S. patent application Ser. No. 15/338,841 filed Oct. 31, 2016; U.S. patent application Ser. No. 14/357,118 filed May 8, 2014; International PCT Application PCT/GB2012/052782 filed Nov. 8, 2012 and published under PCT 21(2) in the English language; Great Britain Patent Application Serial No. 1119418.0 filed Nov. 10, 2011; and Great Britain Patent Application Serial No. 1119419.8 filed Nov. 10, 2011, all of which are incorporated by reference herein.

FIELD OF INVENTION

The present invention relates to perfusion systems for bodily organs, for example human organs, such as the liver, pancreas, kidney, small bowel, but also other organs including non-human organs.

BACKGROUND OF THE INVENTION

It is known, for example from EP 1 168 913, to provide a system for extracorporeal organ perfusion, in which a human or non-human organ can be preserved, for example prior to transplant into a patient. The system typically comprises a reservoir for perfusion fluid, which may be blood or another perfusion solution, and a circuit for circulating the fluid through the organ.

SUMMARY OF THE INVENTION

The present invention provides a set of components for an organ perfusion system, the set comprising a fluid supply duct for supplying fluid to the organ, a fluid removal duct for removing fluid from the organ, and a surrogate organ removably connected between the fluid supply duct and the fluid removal duct so as to form a fluid circuit, so that fluid can be circulated in the circuit in preparation for connection of the organ. The set may be disposable. For example it may be arranged for a single use.

The fluid supply duct and the fluid removal duct may be arranged for connection, directly, or indirectly, to an oxygen adding means so that oxygen can be added into fluid in the circuit.

The set may further comprise a measuring duct, which may be connected between the fluid supply duct and the fluid removal duct, or may be connected between two other suitable places in the circuit, and measuring means arranged to measure the content of at least one component of the fluid. The measuring duct may be arranged to bypass the organ. The measuring duct may be of a smaller diameter than the supply duct and the fluid removal duct.

The set may further comprise a pump arranged to pump fluid round the circuit. This may be located, for example, in the fluid removal duct.

The set may further comprise a fluid reservoir arranged to contain fluid for circulation in the circuit. The set may further comprise a pressure control duct arranged to connect the reservoir to a return port of an oxygen adding means.

The set may further comprise a fluid return duct arranged to return fluid produced by the organ or fluid, which may be perfusion fluid leaked, by the organ into the circuit. If the organ is a liver, the fluid may be ascites. For other organs the fluid may be a different fluid. The fluid return duct may be arranged for connection to the reservoir, whether the reservoir is part of the set or not. The set may further comprise a pump arranged to pump fluid in the fluid return duct. The set may comprise a fluid level sensor arranged to measure the level of the fluid produced by the organ. The set may comprise a sump, to which the fluid return duct is connected, for collecting the fluid produced by the organ.

The set may further comprise a collection system for collecting fluid produced by the organ. This may be a different fluid. For example, in the case of a liver it may be bile, or in the case of a kidney it may be urine. The set may further comprise measurement means for measuring the volume of the fluid produced by the organ.

The set may further comprise a further fluid supply duct removably connected to the surrogate organ. This is appropriate, for example, for perfusion of a liver, whereas other organs, such as the pancreas, only require one fluid supply duct. The further fluid supply duct may be arranged for connection to a reservoir, whether or not that forms part of the set.

The set may further comprise a connector for connection to a fluid supply. The connector may be arranged to be at the lowest point of the circuit when the circuit is in use. For example it may be in the fluid removal duct.

The set may further comprise an air vent. The air vent may be arranged to be located above the reservoir. The air vent can be used to vent air from the system as the circuit is filled with fluid.

The whole system may be arranged such that there are no, or substantially no, air traps within it. For example the whole of the perfusion circuit may be arranged to slope upwards from the connector for the fluid supply to the air vent, so that fluid can fill the circuit from the supply, no air pockets will be trapped in the circuit, and all air in the circuit will be vented out and replaced by fluid.

The set may further comprise a support panel arranged to support at least one of the ducts, which may be in the form of flexible tubing.

The support panel, an organ container and a pump may form separate units of the set. The units may be connected together by one or more of the ducts, which may be flexible. This may allow the units to be moved between a folded state for storage and an unfolded state for use, whilst connected together.

Indeed the present invention further provides a set of components for an organ perfusion system, the set comprising a support panel supporting a component, such as at least one flexible tube, forming part of the system, an organ container, and a pump, wherein the support panel, the organ container and the pump form separate units of the set which are connected together by one or more flexible tubes, so that the units can be moved between a folded state for storage and an unfolded state for use, whilst connected together. The flexible tube or tubes may form part of a perfusion circuit of the system.

The support panel may have a channel formed therein, in which the at least one flexible tube or duct is located. The support panel may further comprise a tab, which may be formed integrally with the panel, and may be arranged to retain the tube or duct in the channel. The channel may be divided into two channel sections which are spaced apart. The panel may have an aperture through it. The aperture may extend around three sides of the tab. The two channel sections may open into the aperture. This may enable a portion of the flexible tube or duct to be bent, fitted through the aperture, and then straightened so as to be retained in the channel by the tab.

The present invention further provides a support panel for supporting a length of flexible tubing or other flexible member, the panel having a channel formed therein, wherein the channel is divided into two channel sections which are spaced apart, and the panel has an aperture through it, between the channel sections, which extends around three sides of a portion of the panel which forms a tab, the two channel sections opening into the aperture so that a portion of the flexible member can be bent, fitted through the aperture, and then straightened so as to be retained in the channel by the tab.

The panel on either side of each of the channel sections may lie in a common flat plane. The tab may be flat and may be formed in the same plane. The depth of the channel may be greater than the sum of the diameter of the flexible member and the thickness of the tab, so that the flexible member can be straightened completely within the two channel sections.

The panel may comprise a recess arranged to receive an oxygenator in it. The panel may comprise a recess arranged to receive a fluid reservoir in it.

The present invention further provides a method of making a support panel according to the invention, the method comprising providing the panel with the two channel sections formed in it, and cutting the aperture through the panel so as to leave the tab.

At least one of the two channel sections may be formed with an end wall. The cutting step, or a separate cutting or other removal step, may remove the end wall.

The present invention further provides a perfusion system for the perfusion of an organ, the system comprising a perfusion fluid circuit for circulating perfusion fluid through the organ, the circuit comprising a fluid supply duct for supplying fluid to the organ and a fluid removal duct for removing fluid from the organ, the system further comprising a surrogate organ arranged to be connected between the fluid supply duct and the fluid removal duct so that fluid can be circulated in the circuit in preparation for connection of the organ.

The present invention further provides a method of preparing an organ perfusion system for perfusion of an organ, the method comprising providing a perfusion system with a surrogate organ connected into it, circulating perfusion fluid through the system including the surrogate organ in preparation for connection of the organ. The perfusion system may be any system according to the invention as described above. The perfusion system may comprise any set of components according to the invention as described above.

Preferred embodiments of the present invention will now be described by way of example only with reference to the accompanying drawings.

DESCRIPTION OF THE PREFERRED EMBODIMENTS

Figure 1:
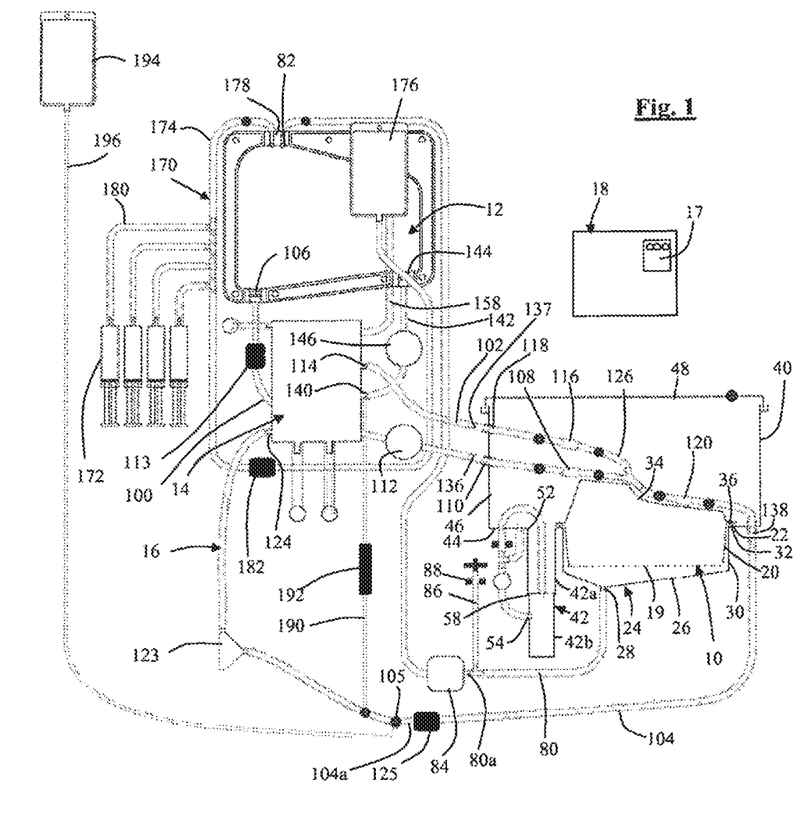
FIG. 1 is a schematic diagram of a perfusion system according to an embodiment of the invention.
Figure 2:
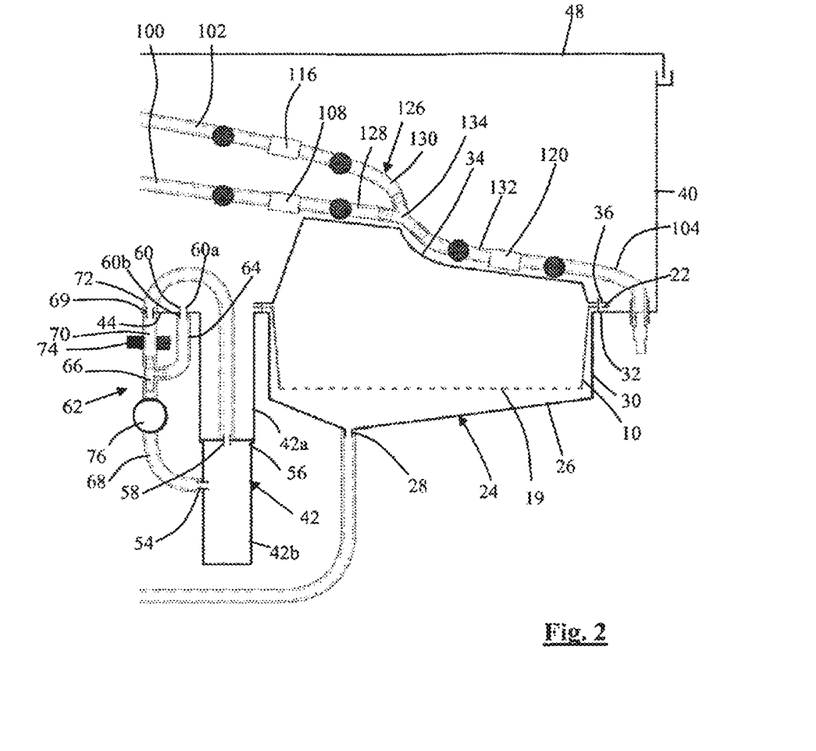
FIG. 2 is an enlargement of part of FIG. 1.

Referring to FIGS. 1 and 2, a perfusion system according to an embodiment of the invention generally comprises a sling 10 in which an organ can be supported, a fluid reservoir 12, an oxygenator 14, and a perfusion circuit 16 arranged to circulate fluid between the reservoir, the organ, and the oxygenator during perfusion. A controller 18 is arranged to control the functioning of the system as will be described in more detail below.

The sling 10 is of moulded plastics or other suitable material and designed to be compliant so as to enable non-traumatic support of the organ whilst providing a degree of shock absorption during transport. The sling 10 has a perforated base 19 through which fluids leaking from the organ can flow out, and side walls 20 extending upwards from the base 19, and a rim 22 extending around the top of the side walls 20. A fluid sump 24 which, where the organ is a liver, forms an ascites sump, is located beneath the sling 10, and comprises a concave base 26 that tapers downwards to a drainage hole 28, which is formed through its lowest point. The sump 24 is arranged to catch fluid leaking through the base 19 of the sling. The sump 24 also comprises side walls 30 that extend upwards from the base 26, around the side walls 20 of the sling, and have a flange 32 around their top which supports the rim 22 of the sling 10. A removable cover 34, which is of moulded plastics, fits over the top of the sling 10 and has a rim 36 around its lower edge which fits against the rim 22 of the sling.

The sling 10 is supported within an organ container 40 which has the ascites sump 24 and a bile sump 42 supported in its base 44, and in this embodiment formed integrally with it. The organ container 40 has side walls 46 extending upwards from its base 44 and a removable cover 48. The bile sump 42 is about twice as deep as the ascites sump 24 and generally narrow and tubular in shape, and extends downwards from the base 44 of the container 40 with its rim 52 level with the rim 32 of the ascites sump 24 and the rim 22 of the sling.

The bile sump 42 is formed in two parts, an upper part 42a and a lower part 42b, both of which are integral with the base 44 of the organ container. The lower part 42b has a bile inlet port 54 formed in its side, towards its upper end 56, and a bile overflow port 58 formed in its upper end. A bile outlet port 60 is formed in the base 44 of the organ container close to the top of the bile sump, with an upper connector 60a for connection via a cannula to the liver, and a lower connector 60b for connection to a bile measurement system 62. The bile measurement system 62 is arranged to measure the volume of bile secreted by the liver before allowing it to flow into the bile sump 42.

As can best be seen in FIG. 2, the bile measurement system 62 comprises a bile receiving duct 64 having its upper end connected to the lower connector 60b, and its lower end connected to a T-piece connector 66, a bile outlet duct 68 having its upper end connected to the connector 66 and its lower end connected to the bile inlet port 54, and an overflow duct 70 having its lower end connected to the connector 66 and its upper end connected to a further port 69 formed in the base 44 of the container. An overflow pipe 72 connects the top of the further port 69 to the bile overflow port 58 in the top of the lower part 42b of the sump. A liquid level sensor 74 is arranged to measure the level of fluid in the overflow duct 70 and to output a signal indicative of the fluid level to the controller 18. In this embodiment the liquid level sensor 74 is arranged to detect when the liquid level in the overflow duct 70 reaches a predetermined height, and send a signal indicative of this to the controller 18. A flow control valve, which in this embodiment comprises a pinch valve 76, in the bile outlet duct 68 is switchable between a closed state in which it closes the outlet duct 68 so that bile can build up on the measurement system 62 and an open state in which it allows bile to drain from the measurement system 62 into the bile sump 42. The controller 18 is arranged to control the flow control valve 76.

The controller 18 is arranged to measure the rate at which bile is secreted by the liver by closing the pinch valve 76 so that bile builds up in the outlet duct 68, and then in the bile receiving duct 64 and overflow duct 70. When the level sensor 74 detects that the bile has reached the predetermined level, it is arranged to send a signal to the controller 18 which responds by opening the pinch valve 76, for example for a predetermined period, to allow the bile to drain out of the measurement system into the sump, and then closes it again so that bile can start to collect in the measurement system again. The controller 18 is also arranged to record in memory the times at which the bile reaches the predetermined level, and therefore the times at which the measurement system is filled. This information, together with the known volume of the system when it is filled to the predetermined level, allows the rate at which bile secreted over time to be monitored. For example the controller 18 may be arranged to calculate a flow rate each time the valve 76 is opened from the known volume of the system and the time interval between the valve opening and the previous valve opening. That flow rate can be displayed on the GUI 17, being updated each time a new calculation of flow rate is recorded. Alternatively, the controller 18 may be arranged to store this flow rate information in memory, so that flow rate data for the whole perfusion process can be stored and then output or displayed via the GUI 17. As a further alternative, the controller may not perform any calculation but may generate an output which varies with the flow rate, and the GUI may be arranged to respond to the output by generating a display, such as a line graph, which is indicative of the flow rate, for example by having appropriately marked axes. It will be appreciated that, for organs other than the liver, this measurement system can be arranged to measure other fluids leaking from, or excreted by, the organ during perfusion, and to record and display the measured volume. For example the organ may be a kidney and the fluid may be urine.

Referring back to FIG. 1, an ascites duct 80 is connected at one end to the drainage hole 28 in the bottom of the ascites sump 26 and at the other end to an ascites return port 82 in the top of the fluid reservoir 12. The ascites duct 80 has a central portion 80a that is the lowest part of the duct 80, being below the level of the ascites sump 26, as well as below the level of the reservoir 12. An ascites pump 84 is provided in the central portion 80a of the ascites duct 80 to pump ascites from the sump 26 back up into the reservoir 12. An ascites measurement tube 86 extends vertically upwards from the central portion 80a of the ascites duct, adjacent to, and upstream of, the pump 84, and has a fluid level sensor 88 in it. This level sensor 88 is arranged to detect, and output a signal, when fluid in the measurement tube 86 reaches a predetermined level that is below the base 19 of the sling 10, and in this embodiment above the drainage port 28 in the ascites sump. The fluid level sensor 88 is connected to the controller 18 which receives the signals from it, and can therefore detect when the level of ascites in the sump reaches a predetermined level. In response to this the controller 18 is arranged to activate the ascites pump 84, for example for a predetermined time, to reduce the level of ascites in the sump 26. The speed of the pump 84 may be variable and the controller 18 may be arranged to control the speed of the pump, or the duty ratio of the pump, or the average speed of the pump, on the basis of the measured fluid level. In other embodiments the ascites level sensor can be located within the sump 26. Indeed any suitable system for measuring the volume of accumulated ascites can be used as feedback to control the operation of the pump 84. For example a pressure sensor located close to the pump 84 could be used to measure accumulated ascites volume. In still other embodiments the ascites pump 84 can simply be arranged to operate for fixed periods with no measurement of ascites volume.

In a modification to this embodiment, there is a further ascites level sensor in addition to the sensor 88, so that the sensors can detect when the ascites level reaches upper and lower levels. The controller 18 is arranged to start the ascites pump 84 when the ascites is detected as reaching the upper level, and to step the ascites pump 84 when the ascites level drops to the lower level. The controller is then arranged to record the timing of each time the pump is turned on, and this provides an indication of the total volume of ascites and the flow rate of ascites during perfusion. This information can be stored and displayed on the GUI 17 in the same way as the bile measurements. It will be appreciated that, for other organs, this measurement system can be used to measure the total volume or flow rate of other fluids leaking from, or excreted by, the organ during perfusion. This measurement can also be provided with only one ascites level sensor as shown in FIG. 1, for example if the pump 84 is arranged to operate until it has pumped all of the ascites that is upstream of the pump 84, which can be assumed to be a fixed volume.

The perfusion circuit 16 further comprises a first fluid supply duct 100, which when used for perfusion of a liver forms a portal duct, a second fluid supply duct 102, which when used for perfusion of a liver forms a hepatic artery duct, and a fluid removal duct 104, which when used for perfusion of a liver forms an inferior vena cava (IVC) duct. The system and its operation will now be described for perfusion of a liver, but it will be appreciated that it can equally be used for other organs. The portal duct 100 has one end connected to an outlet port 106 in the fluid reservoir and the other end attached to a portal vein connector 108. The portal duct 100 extends through a port 110 in the side wall 46 of the organ container 40 so that the portal vein connector 108 is located inside the container. A flow control valve 112, in the form of a pinch valve, having a variable degree of opening, is provided in the portal duct 100 and is connected to the controller 18. The controller 18 is arranged to vary the degree of opening of the pinch valve 112 so as to control the rate of flow of fluid from the reservoir 12 to the portal vein of a liver. A portal flow sensor 113 is provided in the portal duct 100 and is arranged to output a signal indicative of the flow rate of fluid in the portal duct 100. The output of the flow sensor 113 is connected to the controller 18 which can therefore monitor the flow rate in the portal duct. The controller 18 is also arranged to determine from the flow sensor 113 signal when the flow of fluid from the reservoir ceases due to the reservoir being empty. In response to detection of an empty reservoir the controller 18 is arranged to close the flow control valve 112 so as to prevent air from reaching the organ. The hepatic artery duct 102 has one end connected to a first outlet port 114 of the oxygenator 14 and the other end attached to a hepatic artery connector 116. The hepatic artery duct 102 extends through a port 118 in the side wall 46 of the organ container 40 so that the hepatic artery connector 116 is located inside the container. The IVC duct 104 has one end attached to an IVC connector 120, which is located inside the container 40, and extends out through a port 122 in the base 44 of the organ container 40, having its other end connected to an inlet port 124 of the oxygenator 14. A pump 123 is provided in the IVC duct 104 having its inlet connected by a part of the IVC duct 104 to the IVC connector 120, and its outlet connected to the inlet port 124 of the oxygenator 14. The pump 123 is, arranged to pump fluid from the IVC duct 104 into the oxygenator 124. The pump 123 is a variable speed pump and is connected to, and controlled by, the controller 18. An IVC flow sensor 125 is arranged to measure the rate of fluid flow rate in the IVC duct 104 and is arranged to output a signal indicative of the flow rate of fluid in the vena cava duct 104. The output of the flow sensor 125 is connected to the controller 18 which can therefore monitor the flow rate in the IVC duct 104.

Each of the connectors 108, 116, 120 is a quick-release connector arranged to allow the duct to which it is attached to be connected, either via a cannula to the appropriate vein or artery of the liver, or to a surrogate organ 126 which is arranged to complete the perfusion circuit prior to connection of the real organ. The surrogate organ 126 comprises two inlet ducts 128, 130 for connection to the portal duct 100 and the hepatic artery duct 102, and one outlet duct 132 for connection to the IVC duct 104. In this embodiment the surrogate organ is in the form of a simple Y-piece connector 134 which connects the two inlet ducts 128, 130 to the outlet duct 132 so that, when it is connected into the circuit, fluid can flow through it from the portal duct 100 and the hepatic artery duct 102 to the IVC duct 104.

Figure 3:
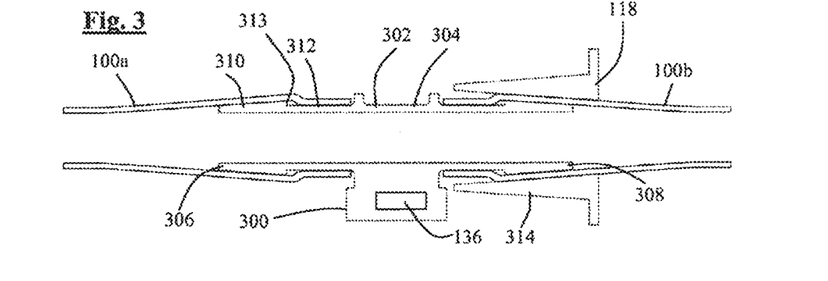
FIG. 3 is a cross section through a connector forming part of the system of FIG. 1.

Each of the portal duct 100, the hepatic artery duct 102 and the IVC duct 104 has a pressure sensor 136, 137, 138 in it, arranged to measure the pressure of fluid in the duct 100, 102, 104. Each of these pressure sensors 136, 137, 138 is arranged to measure pressure at a point close to the respective connector 108, 116, 120, and to output a signal indicative of the pressure at that point. Referring to FIG. 3, the pressure sensor 136 in the portal duct 100 will now be described, but those 137, 138 in the hepatic artery duct 102 and IVC duct 104 are identical. The duct 100 is split into two sections 100a, 100b, and the pressure sensor 136 is located in a moulded plastics sensor housing 300 which forms part of a connector 302 arranged to connect the two sections 100a, 100b of the duct together. The connector 302 comprises a tubular body 304, with the sensor housing 300 formed on one side, centrally between its two ends 306, 308. Each end of the tubular connector body has a stepped outer diameter, having a thicker part 310 at the end, and a thinner part 312 between the thicker part 310 and the sensor housing 300. A step 313 is formed between the two parts 310, 312. The thicker part 310 is tapered, getting thinner towards the end of the body. The portal duct sections 100a, 100b are formed of plastics tubing which have an inner diameter which is similar to the outer diameter of the thinner parts 312 of the connector 302. The tubing can therefore be stretched over the thicker parts 310 of the connector and the step, so that they will grip, and be held in place, on the connector.

The port 118 in the organ housing 40 has a cylindrical wall 314 surrounding it on the outer side of the housing 40. The wall is thicker at its base than at its outer end, so that its inner diameter decreases from its outer end to its inner end. This inner diameter is slightly greater than the thicker parts 310 of the connector body, so that one end of the connector body, with the tubing pushed over it, can be pushed into the aperture within the cylindrical wall 314, so that the tubing is held between the cylindrical wall 314 and the thicker part 310 of the connector, as shown in FIG. 3. The tubing can then be pulled from inside the housing 40 to secure the connector 302 and tubing in place.

Figure 4:
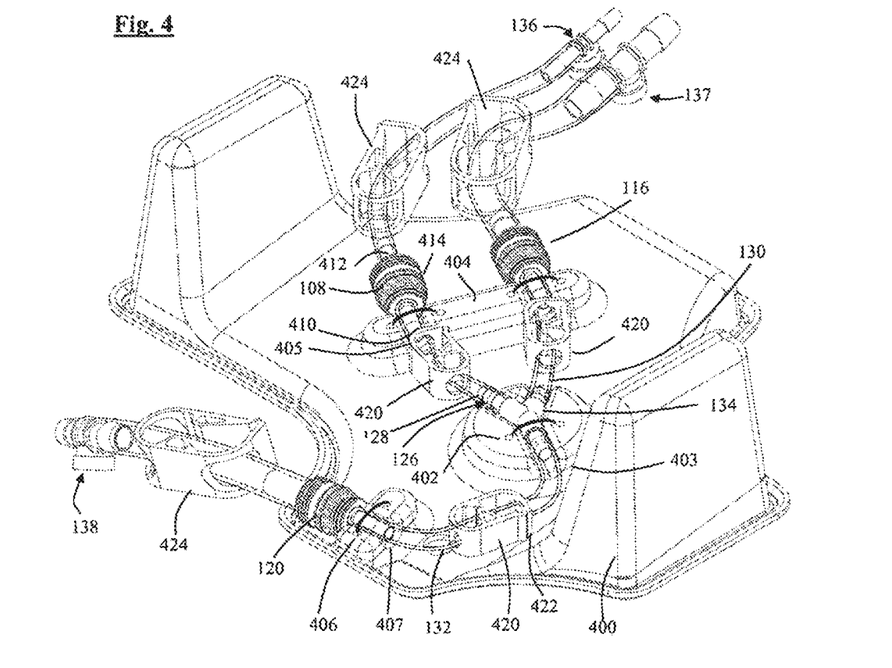
FIG. 4 is a perspective view of a surrogate organ and its connections forming part of the system of FIG. 1.

Referring to FIG. 4, the surrogate organ 126 is supported on a moulded support 400, designed to provide upwards sloping of the surrogate organ to avoid air entrapment during priming. The support has a circular raised turret 402 formed in it which has a Y-shaped groove 403 formed in its top surface in which the Y-shaped connector 134 of the surrogate organ 126 can be located. The support 400 has a further raised turret or strip 404 which has two recesses 405 across its top surface in which the ends of the two inlet ducts 128, 130 of the surrogate organ can be located. The support has a further raised turret 406 having a recess 407 across its top surface in which the end of the outlet duct 132 of the surrogate organ can be located. Each of the connectors 108, 116, 120, which connect the surrogate organ 126 to the two main inlet ducts 100, 102 and the main outlet duct 104, comprises a pipe stub 410 arranged to fit into one of the ducts 128, 130, 132 of the surrogate organ 126, another pipe stub 412 arranged to fit into the end of one of the inlet ducts 100, 102 or the outlet duct 104, and a bellows 414 connecting the two pipe stubs 410, 412 together in a flexible manner so that the connectors can each accommodate a degree of misalignment between the two tube sections they connect together.

Three clamps 420 are provided, one on each of the two inlet ducts 128, 130 of the surrogate organ, and one on the outlet duct 132 of the surrogate organ. Each of these clamps 420 is ratchet clamp that can be closed so as to pinch the duct and seal it to prevent the flow of fluid through it. The ratchet 422 on the clamp retains it in this closed position, but can be released to release the clamp and open the duct. Three similar ratchet clamps 424 are provided, one on each of the main inlet ducts 100, 102 and one on the outlet duct 104, close to the respective connector 108, 116, 120, and between the connector 108, 116, 120 and the pressure sensors 136, 137, 138. These six clamps can be used to seal the ends of the various ducts when the surrogate organ is being connected into, or disconnected from, the perfusion circuit.

Referring back to FIG. 1, the oxygenator 14 has a second outlet port 140 which is connected by a pressure control duct 142 to a pressure control port 144 in the fluid reservoir 12. A flow control valve, in the form of a pinch valve 146, having a variable degree of opening, is provided in the pressure control duct 142 and is connected to the controller 18 so that the controller can vary the degree of opening of the pinch valve 146 thereby to control the return flow of fluid from the oxygenator 14 to the reservoir 12. This, together with the speed of the pump 123, is controlled by the controller 18 to control the pressure of fluid flowing to the organ through the hepatic artery duct 102, as well as the pressure of the fluid in the vena cava duct 104 flowing away form the organ. A vent duct or pipe 158 is connected at its lower end to a fluid through duct in the oxygenator 14 and extends upward so that its upper end is approximately level with the top of the reservoir 12. This vent 158 is closable, and is arranged to be opened during filling of the fluid circuit to vent air from the oxygenator, but is closed during perfusion.

Referring still to FIG. 1, a nutrient control circuit 170 comprises a set of syringes 172, in this case four, each containing a respective nutrient, and a nutrient feed duct 174 which has one end connected to a separate fluid reservoir 176 and the other end connected to a nutrient inlet port 178 in the top of the main fluid reservoir 12. Each of the syringes 172 is connected to the nutrient feed duct 174 by a respective nutrient input duct 180. A nutrient pump 182 is arranged in the nutrient feed duct 174 to pump fluid through the nutrient feed duct from the nutrient feed reservoir 176 into the main reservoir 12 via the nutrient inlet port 178. The pump 182 and the syringes 172 are controlled by the controller 18 so that the rate at which each of the nutrients is fed into the reservoir 12 is controlled.

A small diameter fluid analysis duct 190 has one end connected to the IVC duct 104, upstream of the pump 123, and in this case downstream of the IVC flow sensor 125, and the other end connected to the pressure control duct 142, upstream of the pressure control valve 146, so that fluid can flow through the fluid analysis duct 190 from the pressure control duct 142 to the IVC duct 104, bypassing the organ. A measurement system, in this case in the form of a blood gas analyser (BGA) 192 is arranged to measure various parameters of the fluid flowing through the fluid analysis duct 190. In this embodiment the BGA 192 is arranged to measure the oxygen content and the carbon dioxide content of the fluid flowing through it. Other parameters can also be measured and monitored. The BGA 192 is connected to the controller 18 and arranged to output signals each of which is indicative of the value of one of the parameters it measures, and the controller 18 is arranged to receive those signals so that the parameters can be monitored by the controller 18. The signals therefore include an oxygen level signal, a $CO_2$ level signal, and a glucose level signal in this embodiment.

A priming bag or reservoir 194 is supported at a level which is above the top of the reservoir 12, and connected by a priming duct 196 to the perfusion circuit at a priming point which is in the vena cava duct 104 at its lowest point 104a. This is also the lowest point of the perfusion circuit 16, which allows the whole circuit 16 to be filled from the bottom, as will be described in more detail below.

Figure 5:
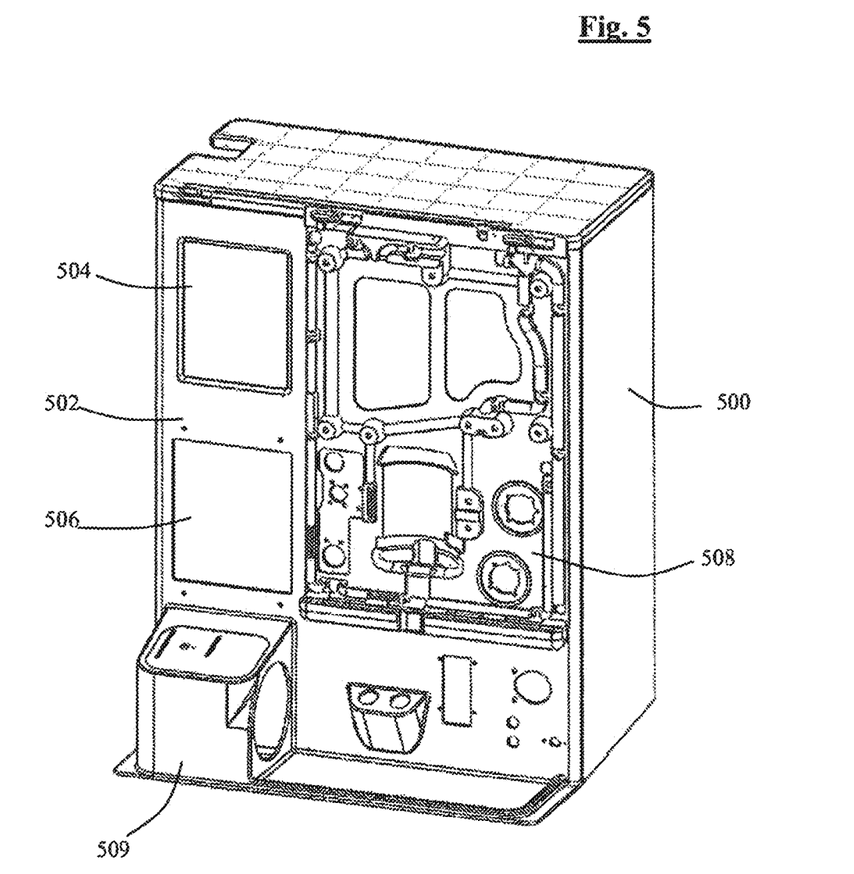
FIG. 5 is a perspective view of a support structure forming part of the system of FIG. 1.

Referring to FIG. 5, a support structure for the perfusion system comprises a housing 500 the front face 502 of which has an aperture 504 behind which the controller 18 and GUI 17 are located, another aperture 506 within which the nutrient syringes 172 are located, and a large aperture in which a disposable support panel or cartridge 508 is located which supports many of the disposable components of the system. A pump support housing 509 is located on the base of the structure to support the perfusion pump 123.

Figure 6:
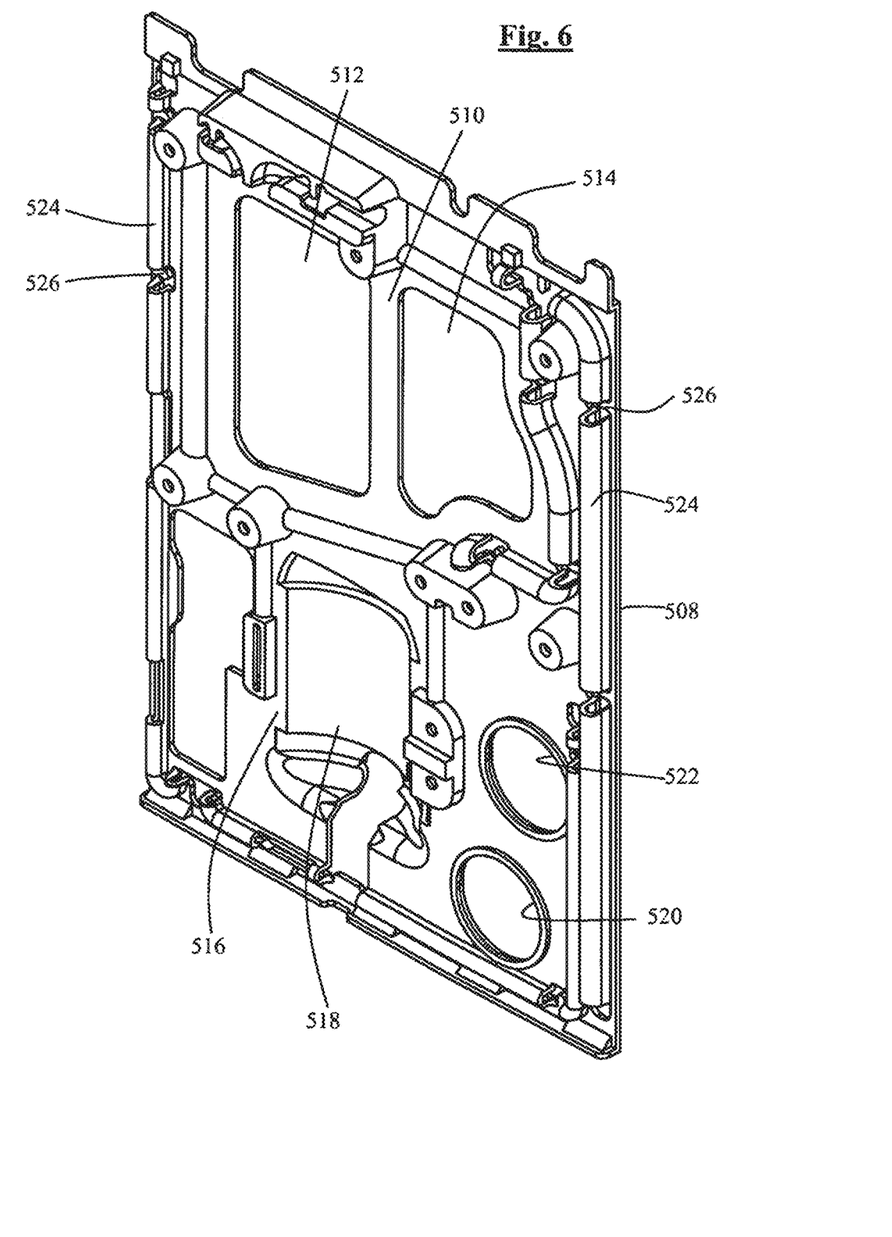
FIG. 6 is a perspective view of a support panel forming part of the structure of FIG. 5.

Referring to FIG. 6, the cartridge 508 comprises a thermoformed plastics panel which has a recessed reservoir support region 510 in its upper half through which a pair of apertures 512, 514 are formed, an oxygenator support area 516 in its lower half which also has a recess formed in it, which may comprise an indentation or an aperture 518 or both, in which the oxygenator can be supported, two control valve apertures 520, 522 in which the pinch valves 112, 146 can be located, and a series of channels 524 formed in it, which are open to the rear, in which the flexible tubing of the fluid circuit ducts can be located. At various points along the channels 524 there is a break in the channel, with a retaining tab 526 which serves to retain the tubing in the channel 524. The formation of the panel so as to include these tabs will now be described.

Figure 7:
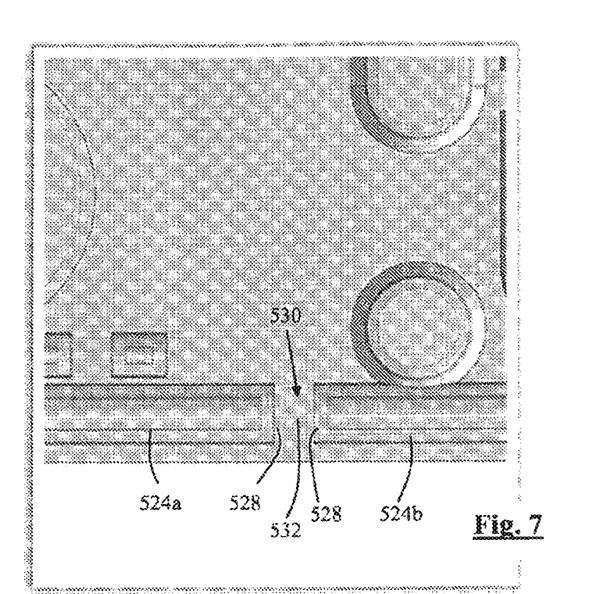
FIG. 7 is a front view of part of the panel of FIG. 6 during its manufacture.
Figure 8:
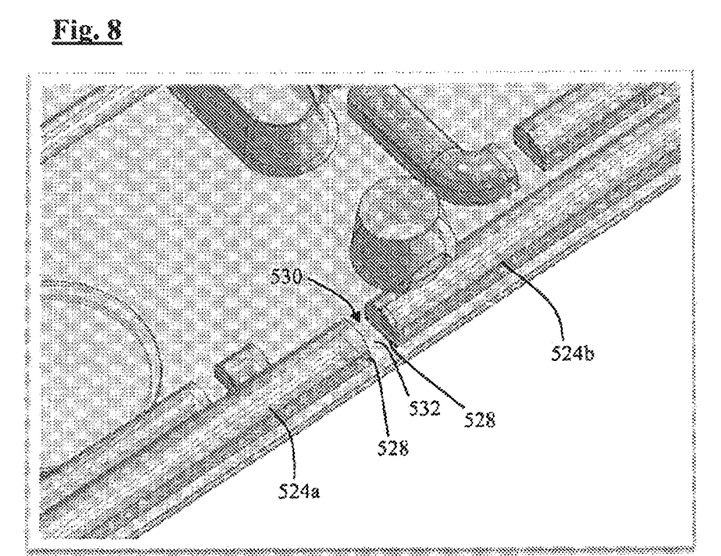
FIG. 8 is a perspective view of the same part of the panel of FIG. 6 during its manufacture.
Figure 9:
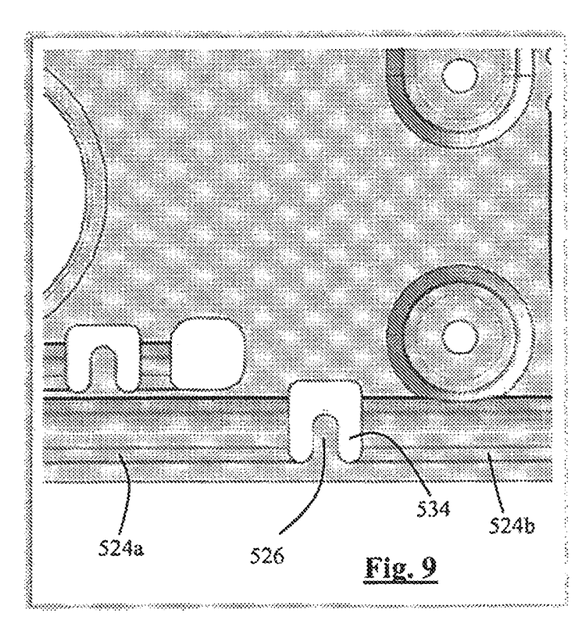
FIG. 9 is a plan view of the same part of the panel of FIG. 6 at a subsequent stage of its manufacture.
Figure 10:
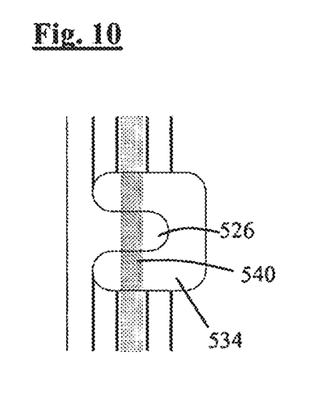
FIG. 10 is a front view of part of the panel of FIG. 6 arranged to retain disposable tubing on the panel.
Figure 11:
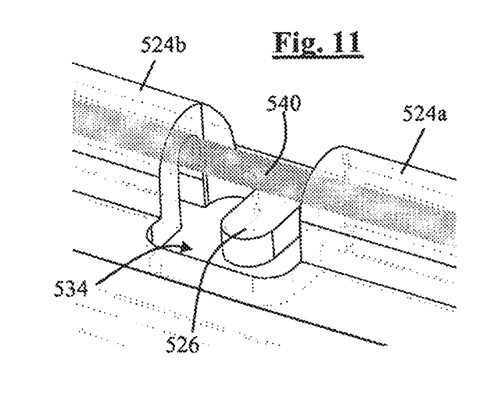
FIG. 11 is a perspective view of the same part of the panel as FIG. 10.

Referring to FIGS. 7 and 8, the first stage of production of the cartridge 508 is thermoforming which is used to form a series of formations in the panel, which is flat prior to the thermoforming. The formations are raised or convex on the front side and hollow or concave on the rear side. The channels 524 are mainly formed in this way, being of generally U-shaped cross section. Where a retaining tab 526 is to be formed, the channel 524 is divided into two separate sections 524a, 524b each of which has an end wall 528, the two end walls 528 facing each other and being separated by a gap 530. Because the panel was flat before being thermoformed, the areas to either side of each of the channel sections are flat and in a common plane. The area 532 of the panel between these end walls 528 is also left flat, and lies in the same plane, i.e., the plane of the original flat panel. Referring to FIG. 9, a cutting step is then performed which removes both of the end walls 528, and part of the area 532 of the panel between them, leaving a tab 526 which is formed from a part of that area 532. The tab 526 extends in a direction perpendicular to the length of the channel 524, having two sides and its free end formed by the cutting step. An aperture 534 is formed through the panel, by the cutting step, which extends around the two sides and the free end of the tab. The ends of the two channel sections 524a, 524b open into that aperture 534 on either side of the tab 526. As can best be seen in FIG. 11, the tubing 540, which forms part of the perfusion circuit, is placed into the channel 524 from the back of the cartridge 508. Where one of the tabs 526 is formed, the tubing can be bent into a U-shape so that it can be pushed through the aperture 534 around the tab 526, and then straightened behind that tab 526 so that the tab 526 retains it in the channel 524. The depth of the channel 524 is greater than the sum of the diameter of the tubing 540 and the thickness of the tab 526 (which is the same thickness as that of the rest of the panel), so that the tubing can be straightened completely within the two channel sections 524a, 524b and across the gap 530 between them.

In other embodiments the cartridge is shaped from a flat panel by methods other than thermoforming, and in still further embodiments, the cartridge is not shaped from a flat panel, but is moulded in a form similar to that of FIGS. 7 and 8 and then cut.

Figure 12:
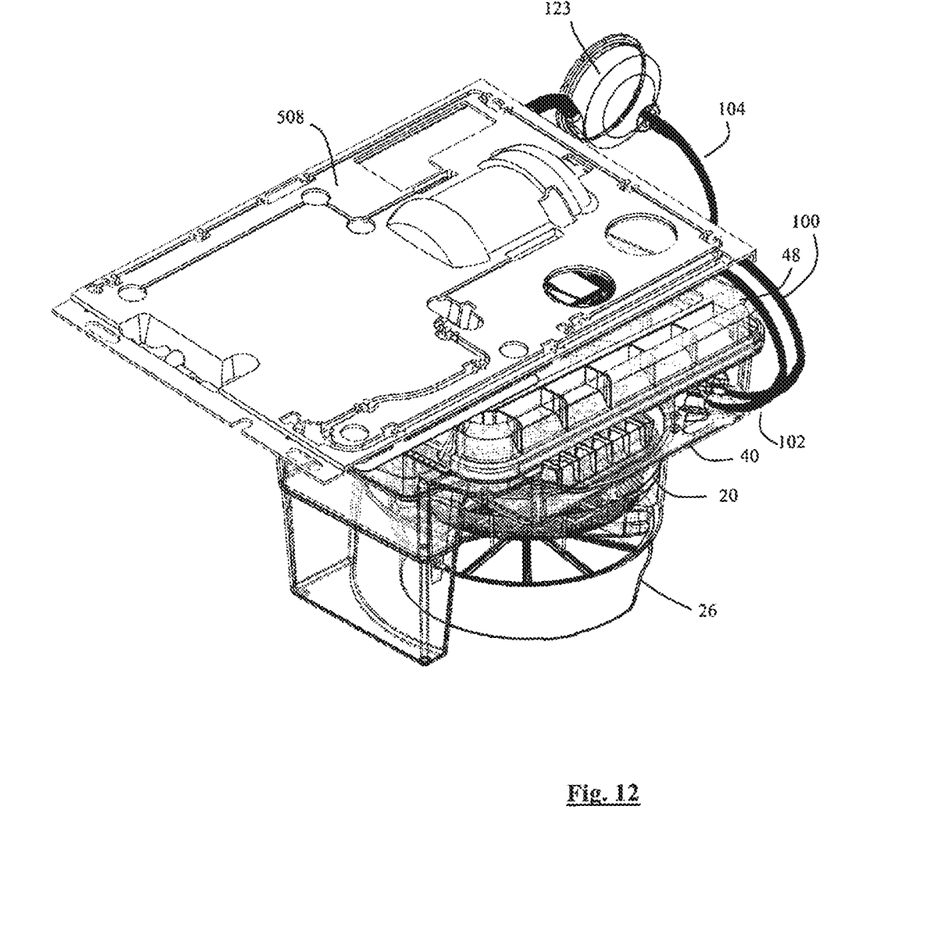
FIG. 12 is a perspective view of parts of the system of FIG. 1 in a folded condition.

Referring back to FIG. 1, and to FIG. 12, much of the system is formed as a disposable set of components which can be connected to the rest of the system, used once, and then disposed of. The main components of the disposable set of this embodiment are shown in FIG. 12. In this embodiment, the disposable set includes the surrogate organ 126, each of the inlet ducts 100, 102 and the outlet duct 104. The flow control valves 112, 146 in the inlet ducts 100, 102 can be re-used, as they are arranged to fit around the flexible tubing forming the respective ducts and to compress it, and therefore do not come into contact with the perfusate. The connectors 300 with integral pressure sensors also form part of the disposable set, although in other embodiments they may be re-usable. The pump 123 in the outlet duct 104 can also be arranged to be disconnected and re-used, but can, as in this embodiment, be connected into the system as part of the disposable set. The sling 10 and sump 24 form part of the disposable set. The whole of the ascites drainage system forms part of the disposable set, including the ascites pump 84, although in other embodiments the pump 84 can be disconnected and re-used. The components of the bile measurement system, including the bile inlet duct 64, the bile overflow duct 70 and overflow pipe 72, the bile outlet duct 68 and the connector 66, all form part of the disposable set. The organ container 40 also forms part of the disposable set. The bile sump, in this case including the lower part 42b and the upper part 42a, forms part of the disposable set. The analysis duct 190 and BGA 192 form part of the disposable set. The nutrient control circuit 170 also forms part of the disposable set. This may include the nutrient pump 182, or that may be dis-connectable and reusable. The priming reservoir 194 and duct 196 form part of the disposable set. The reservoir 12 forms part of the disposable set. All of the ducts of the disposable set are formed of flexible plastics tubing. The vent 158 also forms part of the disposable set.

As shown in FIG. 12, the disposable set also includes the cartridge 508, together with the components it supports, which form one unit of the set, the organ container 40 and its lid 48 together with the sling 10 and sump 26, and bile measurement system and sump, which form another unit of the set, as well as the pump 123 which forms a third unit of the set. The units are connected to each other via the flexible tubing, and can therefore be folded down for storage and transport and unfolded for use. When stored and delivered for use, the cartridge 508 is folded down over the organ container 40, and the pump 123 is connected into the outlet duct 104, but not rigidly supported. This also allows the pump to be moved, or gently tapped, during filling or during operation of the system in the preparation mode, so that air bubbles trapped in the pump are released. When the system is ready for connection of the organ, the pump 123 can be mounted on a pump support housing 509.

Figure 13:
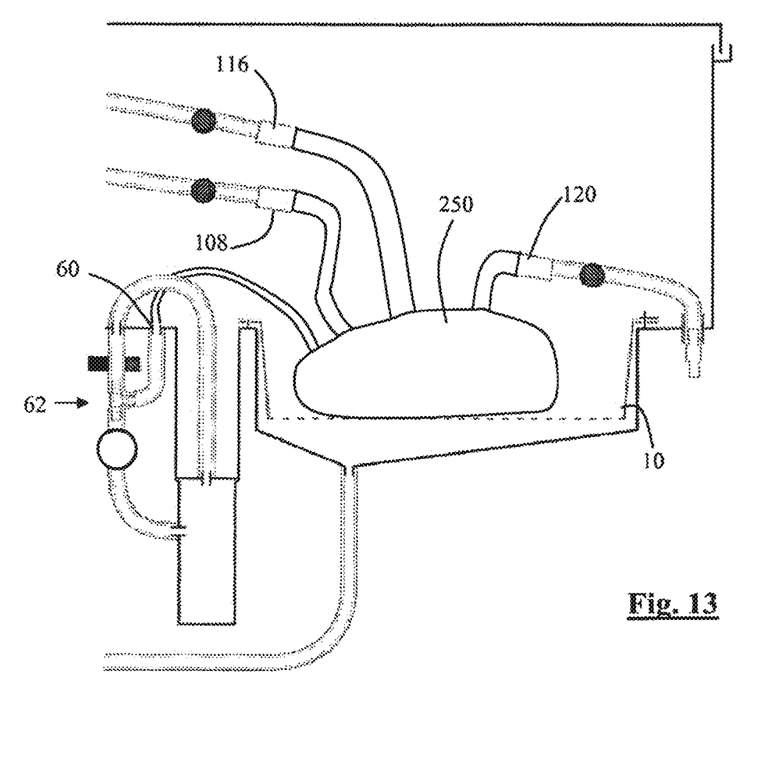
FIG. 13 is a schematic view of an organ connected into the system of FIG. 1.

Referring to FIG. 13, when the system is in operation for perfusing a liver, the surrogate organ 126 is removed, and the liver 250 to be perfused is placed in the sling 10. The portal vein, hepatic artery, inferior vena cava (IVC), and bile duct of the liver are cannulated, and the cannulae connected to the portal vein connector 108, the hepatic artery connector 116, the vena cava connector 120, and the bile outlet port 60 respectively.

While the surrogate organ is present, and in particular while the controller 18 detects that the surrogate organ is present, the controller 18 operates in a preparation mode in which it is preparing the system for connection of the real organ. In this mode, the controller 18 is arranged to control the pump 123 so that it pumps fluid through the oxygenator at a constant flow rate, and monitor and adjust the various parameters of the fluid, as described above, so as to bring them within target ranges suitable for perfusion of a real organ.

To enable connection of the real organ, the pump 123 is stopped. The GUI 17 allows a user demand to be input to the controller 18 to stop the pump 123. When this demand is received by the controller, the controller is arranged to stop the pump 123 so that circulation of the perfusate stops. The surrogate organ 126 is then disconnected from the circuit, and the organ 250 connected into the circuit as shown in FIG. 3. The controller is arranged, when it receives a "start" demand from a user, input via the GUI 17, to start the pump 123 at a constant rate again, and again to monitor the pressures in the hepatic artery duct 102 and the IVC duct 104 and compare them. Now, as the real organ 250 provides a significant resistance to perfusate flow, a pressure differential will quickly build up across the organ 250. Specifically, the pressure in the hepatic artery duct 102 increases as perfusate is pumped into it, and the pressure in the IVC duct 104 decreases as perfusate is pumped away from it. When the controller detects that the difference between the pressures in those two ducts reaches a predetermined level, this provides an indication that the real organ 250 is connected into the circuit and the controller switches to a perfusion mode. In the perfusion mode the controller 18 is arranged to control the pressure in the hepatic artery duct 102 and the IVC duct 104, by controlling the speed of the pump 123 and the degree of opening of the pressure control valve 146 as described above, to maintain them at approximately constant pressures.

With the real organ 250 present, the controller 18 is arranged to start to measure the volume of bile using the bile measurement system 62 as described above. It is also arranged to start draining ascites from the sump 26, and measuring the volume of that ascites, as described above. The controller is also arranged to record the total number times that the bile measurement system valve 76 is opened and the total number of times that the ascites pump 84 is activated to measure the total volume of bile and the total volume of ascites that are produced by the liver during perfusion. It is also arranged to measure the time between each pair of subsequent operations of the valve 76, and each pair of subsequent operations of the pump 84, and to calculate for each pair of operations, an associated flow rate of bile, and an associated flow rate of ascites, from the liver.

It will be appreciated that, if an organ other than the liver is connected into the system, the bile measurement system and the ascites measurement system can each be used to measure different fluids as produced by that organ. For example they can be used to measure urine from a kidney. Also in another embodiment of the system, a measurement system which is the same as the bile measurement system 62 described above is included in the ascites duct 80 upstream of the pump 84 to give a more accurate measurement of ascites.

In a still further embodiment, the bile measurement system 62 is provided without the rest of the perfusion system described above, and can then be connected to an organ, such as a liver, during surgery, to measure the volume or flow rate of fluid produced by the organ during surgery.

To set the system up for use, the disposable set is first unfolded and mounted on the support stand 500. The surrogate organ 126 is already connected into the circuit as part of the disposable set, as is the oxygenator 14, and the pump 123. The perfusion circuit is then filled with perfusate. To achieve this, the flow control valves 112, 146 in the portal duct 100 and pressure control duct are opened A perfusion bag 194 containing perfusate is connected to the upper end of the priming duct 196. The priming bag 194 is then raised to a level that is higher than top of the fluid reservoir 12. This causes perfusate fluid from the priming bag to flow into the perfusion circuit at the priming point 104a in the vena cava duct 104, and flow upwards through the whole perfusion circuit from that point. As the fluid level in the perfusion circuit rises, this fills the vena cava duct 104, the surrogate organ 126, the hepatic artery duct 102 and the portal duct 100, the through duct 150 of the oxygenator, and the pressure control duct 142, and the reservoir 12, with the ports 82, 178 in the top of the reservoir being used to vent air out of the system as it fills. The pump head can be independently moved and tapped relative to is driving motor to enable removal of any gas trapped within the pump head during filling. After filling, the ascites duct 80 is connected to the ascites return port 82 and the nutrient feed duct 174 is connected to the nutrient feed port 178, and the system is then complete and ready for use.

When the perfusion circuit 16 has been filled, the system is switched on, for example by a user inputting a start command using the GUI 17 and starts to run and the controller 18 is arranged to control the system as follows. When the system starts to run, the pressure control valve 146 in the pressure control duct is closed, so that pumping fluid through the oxygenator will tend to increase the pressure in the hepatic artery duct 102, and the flow control valve 112 in the portal vein duct is opened. Initially, therefore, the pump 123 pumps fluid through the hepatic artery duct 102, through the surrogate organ 126, and through the IVC duct 104. As the flow rate through the IVC duct 104 is the same as that through the hepatic artery duct 102 (as they are connected together through the oxygenator and there is no flow through the pressure control duct 142) there will be substantially no flow through the portal vein duct 100. The controller 18 is arranged initially to control the pump 123 to operate at a constant speed and to monitor the pressures in the hepatic artery duct 102 and the IVC duct 104 and compare them. Since the surrogate organ 126 is present, the pressure drop across it is low, in particular significantly lower than what it would be if a real organ were connected into the circuit, and this enables the controller 18 to detect the presence of the surrogate organ from the outputs from the difference between the pressures measured by the pressure sensors 136, 138.

While the surrogate organ is present, and in particular while the controller 18 detects that the surrogate organ is present, the controller 18 operates in a preparation mode it which it is preparing the system for connection of the real organ. In this mode, the controller 18 is arranged to control the pump 123 so that it pumps fluid through the oxygenator at a constant flow rate, and monitor and adjust various parameters of the fluid, so as to bring them within target ranges suitable for perfusion of a real organ.

To enable connection of the real organ, the pump 123 is stopped. The GUI 17 allows a user demand to be input to the controller 18 to stop the pump 123. When this demand is received by the controller, the controller is arranged to stop the pump 123 so that circulation of the perfusate stops. All ratchet clamps are closed so as to avoid leakage of fluid from either the perfusion circuit or the surrogate organ. The surrogate organ 126 is then disconnected from the circuit, and the organ 250 connected into the circuit as shown in FIG. 5. Following successfully connection, all ratchet clamps are re-opened. The controller is arranged, when it receives a "start" demand from a user, input via the GUI 17, to start the pump 123 at a constant rate again, and again to monitor the pressures in the hepatic artery duct 102 and the IVC duct 104 and compare them. Now, as the real organ 250 provides a significant resistance to perfusate flow, a pressure differential will quickly build up across the organ 250. Specifically the pressure in the hepatic artery duct 102 increases as perfusate is pumped into it, and the pressure in the IVC duct 104 decreases as perfusate is pumped away from it. When the controller detects that the difference between the pressures in those two ducts reaches a predetermined level, this provides an indication that the real organ 250 is connected into the circuit and the controller switches to a perfusion mode. In the perfusion mode the controller 18 is arranged to control the pressure in the hepatic artery duct 102 and the IVC duct 104, by controlling the speed of the pump 123 and the degree of opening of the pressure control valve 146 as described above, to maintain them at approximately constant pressures. As mentioned above, the presence of the real organ can be detected by detecting simply when the pressure in the hepatic artery duct 102 reaches a predetermined level.

Figure 14:
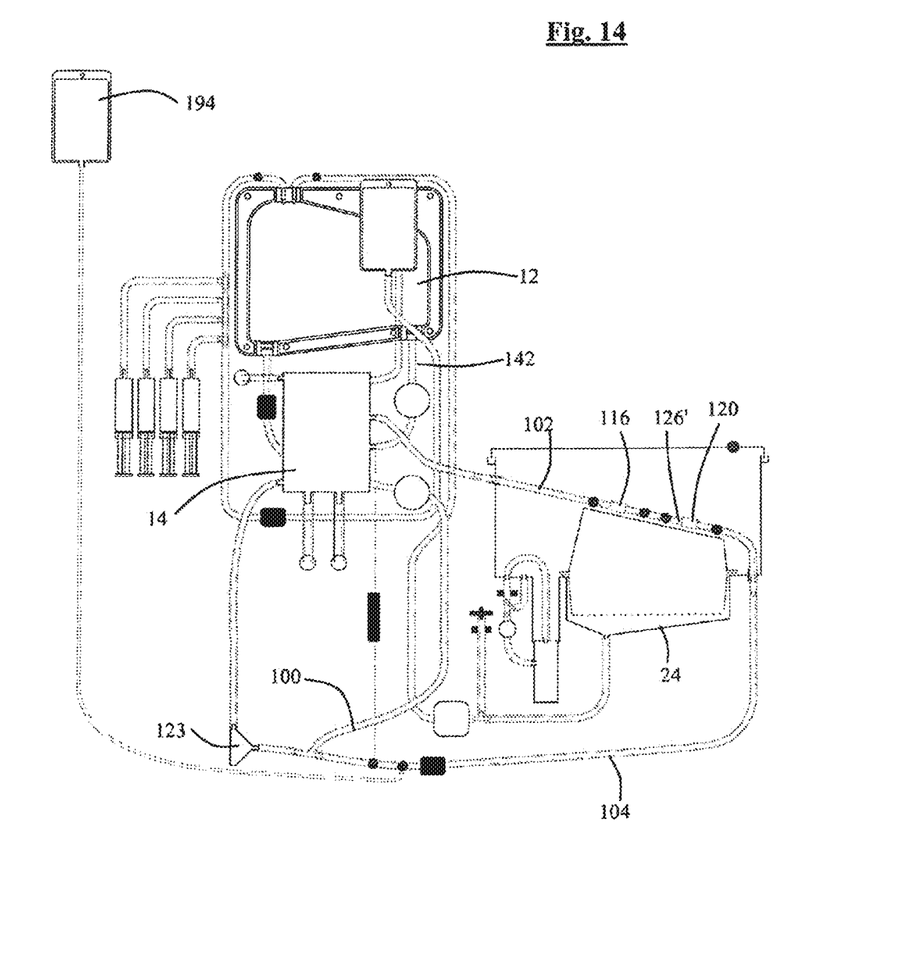
FIG. 14 is a schematic diagram, similar to FIG. 1, of the system modified for perfusion of a different organ.

Referring to FIG. 14, the system of FIG. 1 can be modified for perfusion of a pancreas, or other organ with only one vein and one artery that need connection to the perfusion circuit. The only significant modification is that the downstream end of the first fluid supply duct 100 is not connected to the organ, but instead is connected to the fluid removal duct 104 just upstream of the pump 123. The other two ducts are connected to the organ in the same way as for the liver: the second fluid supply duct 102 is connected to the organ to supply perfusion fluid to the organ, and the fluid removal duct 104 is connected to the organ to carry perfusion fluid from the organ. When the organ is not present, the circuit can be completed using a surrogate organ 126' which in this case is a simple length of conduit having an inlet end and an outlet end, each of which has a connector on it so that they can be connected to the second connector 116 and the third connector 120 respectively. Operation of the system in this configuration is the same as that described above with reference to FIG. 1, and will not be described again in detail, except that fluid flow from the reservoir 12 through the first duct 100 simply replaces fluid that flows through the pressure relief duct 142 back to the reservoir. For an organ such as the kidney the bile sump and measurement system is not used, and the fluid sump 24 collects urine rather than ascites.

The invention claimed is:

1. An organ perfusion system comprising:
   a perfusion circuit configured for circulating perfusion fluid through the organ;
   an excreted fluid collection sump configured for collecting fluid excreted by the organ;
   an excreted fluid measurement system configured to measure, at each of a plurality of measurement times during perfusion of the organ, a respective flow rate of the excreted fluid produced by the organ; and
   a controller having a memory and configured to store the measurement times and the respective flow rates as flow rate information in the memory; wherein the excreted fluid measurement system comprises an excreted fluid collection volume and a sensor arranged to detect when a predetermined volume of the excreted fluid has collected in the collection volume, and the controller is configured to remove the excreted fluid from the collection volume in response to said predetermined volume being reached, to determine a plurality of times between subsequent occurrences of the predetermined volume being reached, and from each of the plurality of times between subsequent occurrences of the predetermined volume being reached, to determine said respective flow rate of the excreted fluid from the organ.

2. A system as claimed in claim 1 further comprising an excreted fluid inlet, connected to the excreted fluid measurement system, and configured for cannulation to the organ.

3. A system as claimed in claim 1 further comprising a sling for supporting the organ; and
   a leaked fluid sump located below the sling for collecting leaked fluid which has leaked from the organ.

4. A system as claimed in claim 3 further comprising a return duct connected to the leaked fluid sump and arranged to return leaked fluid from the sump to the perfusion circuit.

5. A system as claimed in claim 1 further comprising an outlet from the excreted fluid collection volume and a valve in the outlet, wherein the controller is configured to remove the excreted fluid from the collection volume by opening the valve.

6. A system as claimed in claim 1 wherein the controller is configured to record each occurrence of the predetermined volume being reached thereby to record a total volume of the excreted fluid flowing from the organ.

7. An organ perfusion system comprising:
a perfusion fluid supply duct for supplying perfusion fluid to the organ;
a fluid removal duct for removing perfusion fluid from the organ;
a surrogate organ removably connected between the perfusion fluid supply duct and the perfusion fluid removal duct so as to form a fluid circuit, so that perfusion fluid can be circulated in the circuit in preparation for connection of the organ,
a sling for supporting the organ;
a sump located below the sling for collecting leaked fluid which has leaked from the organ;
a return duct connected to the sump and arranged to return leaked fluid from the sump to the fluid circuit;
an excreted fluid collection sump for collecting waste fluid produced by the organ;
an excreted fluid measurement system configured to measure, at each of a plurality of measurement times during perfusion of the organ, a respective flow rate of the fluid excreted by the organ; and
a controller having a memory and configured to store the measurement times and the respective flow rates as flow rate information in the memory; wherein the excreted fluid measurement system comprises an excreted fluid collection volume and a sensor arranged to detect when a predetermined volume of the excreted fluid has collected in the collection volume, and the controller is configured to remove the excreted fluid from the collection volume in response to said predetermined volume being reached, to determine a plurality of times between subsequent occurrences of the predetermined volume being reached, and from each of the times between subsequent occurrences of the predetermined volume being reached, to determine said respective flow rate of the excreted fluid from the organ.

8. A method of perfusing an organ, the method comprising:
providing a perfusion circuit;
providing an excreted fluid collection volume and a sensor;
connecting the organ into the perfusion circuit;
circulating perfusion fluid through the perfusion circuit and the organ to perfuse the organ;
collecting excreted fluid which is excreted by the organ during the perfusion;
measuring for each of a plurality of times during perfusion of the organ, a respective rate of excretion of the excreted fluid; and
storing in memory each of the rates of excretion of the excreted fluid and the time at which it was measured, as flow rate information; wherein the measuring comprises detecting, using the sensor, when a predetermined volume of the excreted fluid has collected in the collection volume, removing the excreted fluid from the collection volume in response to said predetermined volume being reached and determining a plurality of times between subsequent occurrences of the predetermined volume being reached, and from each of the times between subsequent occurrences of the predetermined volume being reached, determining said respective flow rate of the excreted fluid from the organ.

9. A method as claimed in claim 8 further comprising displaying the flow rate information.

10. A method as claimed in claim 8 wherein the organ is a liver and the excreted fluid is bile.

11. A method as claimed in claim 8 wherein the organ is a kidney and the excreted fluid is urine.

* * * * *